United States Patent
Hua et al.

(10) Patent No.: US 8,321,195 B2
(45) Date of Patent: Nov. 27, 2012

(54) METHOD AND APPARATUS FOR IMPROVING WORD ALIGNMENT QUALITY IN A MULTILINGUAL CORPUS

(75) Inventors: Wu Hua, Beijing (CN); Wang Haifeng, Beijing (CN)

(73) Assignee: Kabushiki Kaisha Toshiba, Tokyo (JP)

( * ) Notice: Subject to any disclaimer, the term of this patent is extended or adjusted under 35 U.S.C. 154(b) by 609 days.

(21) Appl. No.: 12/550,898

(22) Filed: Aug. 31, 2009

(65) Prior Publication Data

US 2010/0057432 A1    Mar. 4, 2010

(30) Foreign Application Priority Data

Sep. 1, 2008    (CN) .......................... 2008 1 0214666

(51) Int. Cl.
*G06F 17/20*    (2006.01)

(52) U.S. Cl. ............. 704/2; 704/4; 704/5; 704/7; 704/8; 704/1

(58) Field of Classification Search ................... 704/2, 4, 704/7, 8, 5, 1
See application file for complete search history.

(56) References Cited

U.S. PATENT DOCUMENTS

| | | | | |
|---|---|---|---|---|
| 5,805,832 A * | 9/1998 | Brown et al. | ...................... | 711/1 |
| 6,304,841 B1 * | 10/2001 | Berger et al. | ...................... | 704/2 |
| 6,349,276 B1 * | 2/2002 | McCarley | .......................... | 704/8 |
| 7,844,447 B2 * | 11/2010 | Wang et al. | ....................... | 704/8 |
| 2007/0203690 A1 * | 8/2007 | Wang et al. | ....................... | 704/2 |

FOREIGN PATENT DOCUMENTS

JP    2007-234023 A    9/2007

OTHER PUBLICATIONS

Peter F. Brown, et al., "The Mathematics of Statistical Machine Translation: Parameter Estimation", Computational Linguistics, vol. 19, No. 2, 1993, pp. 263-311.
Japanese Office Action issued Apr. 24, 2012 in patent application No. 2009-169222 with English translation.

* cited by examiner

*Primary Examiner* — Qi Han
(74) *Attorney, Agent, or Firm* — Oblon, Spivak, McClelland, Maier & Neustadt, L.L.P.

(57) ABSTRACT

A method for improving word alignment quality in a multilingual corpus including a plurality of corresponding sentence pairs between any two languages among a first language, a second language and at least one other language and word alignment information between each of the plurality of corresponding sentence pairs, the method includes inducing word alignment between a first sentence of the first language and a second sentence of the second language by using the word alignment information between the first sentence of the first language and a third sentence of the other language corresponding to the first and second sentences and the word alignment information between the second sentence of the second language and the third sentence of the other language, and combining induced word alignment and the word alignment information between the first sentence of the first language and the second sentence of the second language in the multilingual corpus.

6 Claims, 2 Drawing Sheets

METHOD AND APPARATUS FOR IMPROVING WORD ALIGNMENT QUALITY IN A MULTILINGUAL CORPUS

CROSS-REFERENCE TO RELATED APPLICATIONS

This application is based upon and claims the benefit of priority from prior Chinese Patent Application No. 200810214666.1, filed Sep. 1, 2008, the entire contents of which are incorporated herein by reference.

BACKGROUND OF THE INVENTION

1. Field of the Invention

The present invention relates to technology of information processing, more particularly to technology for improving word alignment quality in a multilingual corpus.

2. Description of the Related Art

In a process of aligning words in a multilingual corpus, current statistical methods can only align bilingual words. Detail description of the current statistical methods can be seen in an article "The Mathematics of Statistical Machine Translation: Parameter Estimation" written by Peter F. Brown, Stephen A. Della Pietra, Vincent J. Della Pietra and Robert L. Mercer, Computational Linguistics, 1993, Vol. 19, Number 2, pages: 263-311, which is incorporated herein by reference (referred to reference 1 below).

Thus, for a multilingual corpus including M languages (M>2), the current methods can only align words in two languages each time. Therefore, word alignment results may conflict with each other since there may be word alignment errors in the aligning process, causing a problem of word alignment inconsistency. Detail description will be given below with a multilingual corpus including English, Chinese and Japanese as an example.

For the multilingual corpus including English, Chinese and Japanese, words in Japanese and Chinese, words in English and Chinese and words in Japanese and English can be aligned respectively by using the above-mentioned current statistical methods. For example, for the following three sentences:

フライト を 変更し たい のですが (which is Japanese sentence that means "I would like to change my flight." in English).

I would like to change my flight.

我 想 改一下 我的 航班 。 (which is Chinese sentence that means "I would like to change my flight." in English)

They can be aligned as:

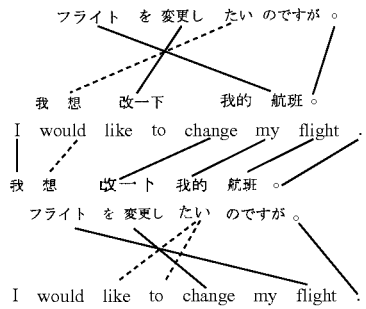

In the above alignments, for Japanese and Chinese, "たい" is aligned with "想", for Japanese and English, "たい" is aligned with "like to", as shown by the dashed lines. Therefore, for Chinese and English, it should be "想" is aligned with "like to", but actually "想" is aligned with "would".

Therefore, in the above alignments, since there are errors in the alignment "たい" with "like to" and the alignment of "想" with "would", word alignment results conflict with each other.

Therefore, there is a need to provide a method for improving word alignment quality and consistency in a multilingual corpus.

BRIEF SUMMARY OF THE INVENTION

According to an aspect of the present invention, there is provided a method for improving word alignment quality in a multilingual corpus, the multilingual corpus comprising a plurality of corresponding sentence pairs between any two languages among a first language, a second language and at least one other language and word alignment information between each of said plurality of corresponding sentence pairs, and the method comprising steps of: inducing word alignment between a first sentence of the first language and a second sentence of the second language by using the word alignment information between the first sentence of the first language and a third sentence of said at least one other language corresponding to the first sentence and the second sentence and the word alignment information between the second sentence of the second language and the third sentence of said at least one other language; and combining the induced word alignment and the word alignment information between the first sentence of the first language and the second sentence of the second language in the multilingual corpus.

According to another aspect of the present invention, there is provided an apparatus for improving word alignment quality in a multilingual corpus, the multilingual corpus comprising a plurality of corresponding sentence pairs between any two languages among a first language, a second language and at least one other language and word alignment information between each of said plurality of corresponding sentence pairs, and the apparatus comprising: a word alignment inducing unit configured to induce word alignment between a first sentence of the first language and a second sentence of the second language by using the word alignment information between the first sentence of the first language and a third sentence of said at least one other language corresponding to the first sentence and the second sentence and the word alignment information between the second sentence of the second language and the third sentence of said at least one other language; and a combining unit configured to combine the word alignment induced by the word alignment inducing unit and the word alignment information between the first sentence of the first language and the second sentence of the second language in the multilingual corpus.

BRIEF DESCRIPTION OF THE SEVERAL VIEWS OF THE DRAWING

It is believed that through the following detailed description of the embodiments of the present invention, taken in conjunction with the drawings, the above-mentioned features, advantages, and objectives will be better understood.

DETAILED DESCRIPTION OF THE INVENTION

Next, a detailed description of each embodiment of the present invention will be given in conjunction with the accompany drawings.

Method for Improving Word Alignment Quality in a Multilingual Corpus

Figure 1:
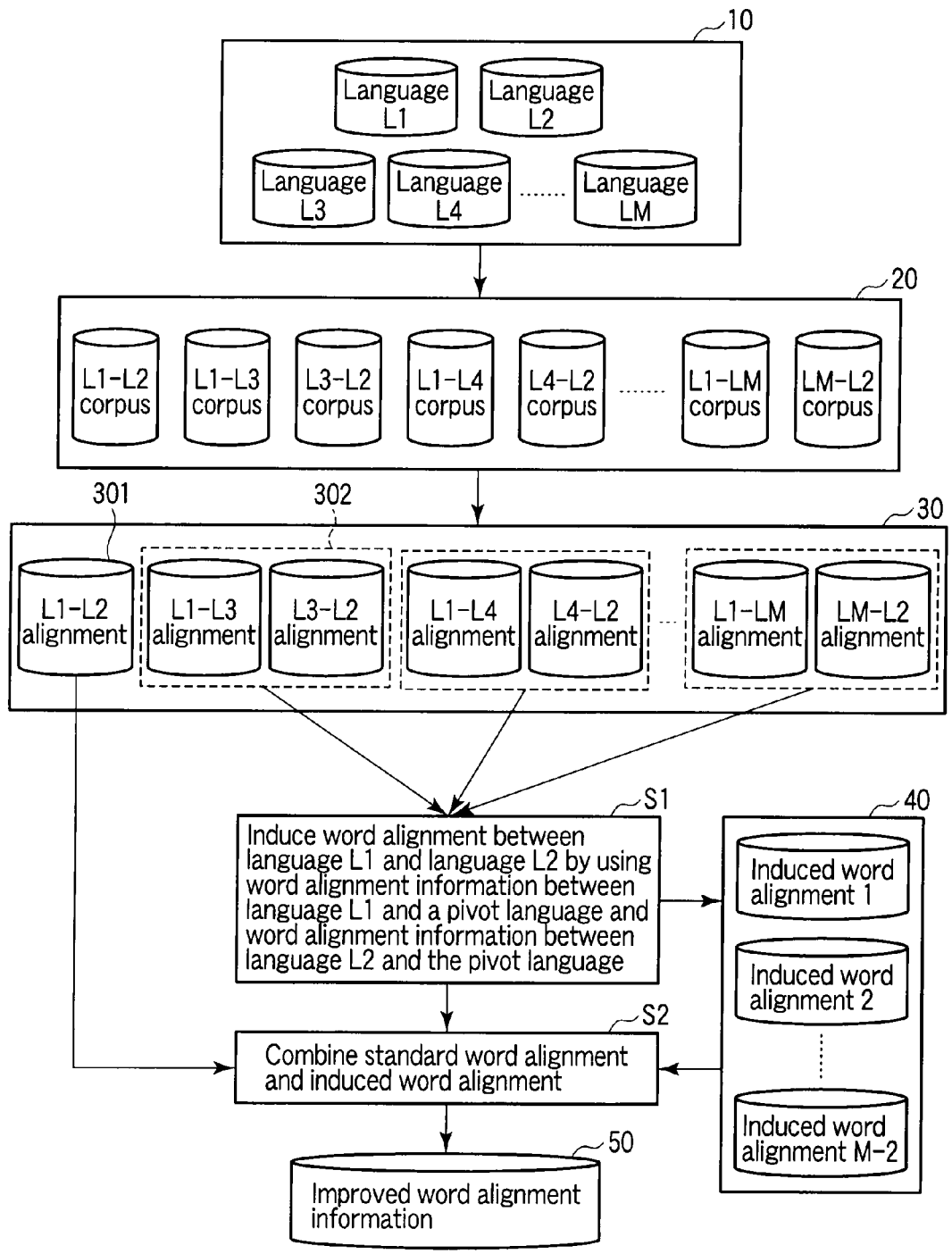
FIG. 1 is a flowchart showing a method for improving word alignment quality in a multilingual corpus according to an embodiment of the present invention.

FIG. 1 is a flowchart showing a method for improving word alignment quality in a multilingual corpus according to an embodiment of the present invention. Before describing the method of the embodiment, the multilingual corpus will be described firstly.

In the embodiment, as shown in FIG. 1, M languages 10 will be described as an example. Moreover, in the embodiment, it will be described to improve word alignment quality and consistency between language L1 and language L2 as an example, and other languages are used as pivot languages.

For language L1 and language L2, there is a bilingual corpus, i.e. L1-L2 corpus, in multilingual corpus 20. For any other pivot languages such as L3, L4, . . . , LM, there are bilingual corpora with language L1, i.e. L1-L3 corpus, L1-L4 corpus, . . . , L1-LM corpus, and bilingual corpora with language L2, i.e. L2-L3 corpus, L2-L4 corpus, . . . , L2-LM corpus in multilingual corpus 20. Therefore, there are 2M-3 bilingual corpora related to language L1 and language L2 in multilingual corpus 20, wherein each of the bilingual corpora includes a plurality of corresponding sentence pairs.

For each of the bilingual corpora, it can be trained by using the statistical methods in the above reference 1, and thereby word alignment information 30 is obtained, which includes 2M-3 word alignment information, i.e. L1-L2 alignment, L1-L3 alignment, L3-L2 alignment, L1-L4 alignment, L4-L2 alignment, . . . , L1-LM alignment, LM-L2 alignment. In word alignment information 30, L1-L2 alignment is used as a standard word alignment between language L1 and language L2, and any two alignments between any pivot language and language L1 and language L2 are used as a pair, as shown by the number 302 in FIG. 1, for induction described below. Moreover, methods for training word alignment information 30 are not limited to the statistical methods in the above reference 1, and the alignment can be performed by hand by a professional person (such as a translator etc.) or automatically with a computer by using any statistical method known by those skilled in the art.

Next, the method for improving word alignment quality in a multilingual corpus according to the embodiment will be described.

As shown in FIG. 1, first at Step S1, induced word alignment 40 between language L1 and language L2 is induced by using word alignment information between language L1 and a pivot language and word alignment information between language L2 and the pivot language.

Specifically, at Step S1, induced word alignment 1 between language L1 and language L2 is induced by using L1-L3 alignment between language L1 and language L3 and L3-L2 alignment between language L3 and language L2. Similarly, for other pivot language L4, . . . , LM, induced word alignment 2, . . . , induced word alignment M-2 are induced.

Next, the process for obtaining induced word alignment 40 will be described in detail by using any one pivot language LS of the pivot languages as an example.

It is assumed that in L1-LS alignment, a sentence e of language L1 and a sentence p of pivot language LS are aligned, and in LS-L2 alignment, a sentence f of language L2 and the sentence p of pivot language LS are aligned. Thus, a translation probability between a word in the sentence e of language L1 and a word in the sentence f of language L2 can be induced by using the following formula (1):

$$t_{L1-L2}(f_j \mid e_i) = \sum_{k=1}^{R} t_{L1-LS}(p_k \mid e_i) \cdot t_{LS-L2}(f_j \mid p_k) \quad (1)$$

wherein $e_i$ is an $i^{th}$ word in the sentence e of language L1, $f_j$ is an $j^{th}$ word in the sentence f of language L2, $p_k$ is an $k^{th}$ word in the sentence p of pivot language LS, $t_{L1-L2}(f_j|e_i)$ is a translation probability between the word $e_i$ in the sentence e of language L1 and the word $f_j$ in the sentence f of language L2, $t_{L1-LS}(p_k|e_i)$ is a translation probability between the word $e_i$ in the sentence e of language L1 and the word $p_k$ in the sentence p of pivot language LS, $t_{LS-L2}(f_j|p_k)$ is a translation probability between the word $f_j$ in the sentence f of language L2 and the word $p_k$ in the sentence p of pivot language LS, and R is the total number of all words in the sentence p of pivot language LS.

That is to say, in the process for obtaining induced word alignment 40 at Step S1 of the embodiment, firstly a product of translation probability $t_{L1-LS}(p_k|e_i)$ between the word $e_i$ in the sentence e of language L1 and the word $p_k$ in the sentence p of pivot language LS with translation probability $t_{LS-L2}(f_j|p_k)$ between the word $f_j$ in the sentence f of language L2 and the word $p_k$ in the sentence p of pivot language LS is calculated, then the products with respect to all words in the sentence p of pivot language LS are summed, and the summed result is used as the induced translation probability between the word in the sentence e of language L1 and the word in the sentence f of language L2.

In the above formula (1), translation probability $t_{L1-LS}(p_k|e_i)$ between the word $e_i$ in the sentence e of language L1 and the word $p_k$ in the sentence p of pivot language LS and translation probability $t_{LS-L2}(f_j|p_k)$ between the word $f_j$ in the sentence f of language L2 and the word $p_k$ in the sentence p of pivot language LS are obtained in the process for obtaining word alignment information 30 and saved in word alignment information 30. The present invention has no limitation on the method for obtaining translation probability $t_{L1-LS}(p_k|e_i)$ and translation probability $t_{LS-L2}(f_j|p_k)$, which can be obtained by using the statistical methods in the above reference 1 or any other methods known by those skilled in the art.

It should be understood although it is described above that the translation probability between the word in the sentence e of language L1 and the word in the sentence f of language L2 is induced by using the above formula (1), the method of the formula (1) is just an example, and the induced word alignment between language L1 and language L2 can be induced based on L1-LS alignment and LS-L2 alignment by using any method known by those skilled in the art.

Return to FIG. 1, after induced word alignment 40 is induced at Step S1, the method of the embodiment runs to Step S2. At Step S2, the standard word alignment between language L1 and language L2 in word alignment information 30 and induced word alignment 40 induced at Step S1 are combined as improved word alignment information 50 between language L1 and language L2.

Specifically, for example, the standard word alignment between language L1 and language L2 and induced word alignment 40 induced at Step S1 can be combined by using the following formula (2):

$$t(f_j \mid e_i) = \sum_{q=0}^{M-2} \lambda_q \cdot t_q(f_j \mid e_i) \quad (2)$$

wherein e is a sentence of language L1, f is a sentence of said language L2, $e_i$ is an $i^{th}$ word in the sentence e of language L1, $f_j$ is an $j^{th}$ word in the sentence f of language L2, $t(f_j|e_i)$ is the combined translation probability between the word $e_i$ in the sentence e of language L1 and the word $f_j$ in the sentence f of language L2, $t_0(f_j|e_i)$ is a translation probability between the word $e_i$ in the sentence e of language L1 and the word $f_j$ in the sentence f of language L2 in the multilingual corpus, $t_q(f_j|e_i)$ is a translation probability, induced by using a $q^{th}$ language in the pivot languages, between the word $e_i$ in the sentence e of language L1 and the word $f_j$ in the sentence f of language L2 when q>0, M is the total number of language L1, language L2 and the pivot languages, and λ is a weight.

That is to say, in the process for combining the standard word alignment between language L1 and language L2 and induced word alignment 40 at Step S2 of the embodiment, firstly an average value between a translation probability between a word in the sentence e of language L1 and a word in the sentence f of language L2 in induced word alignment 40 and a translation probability between the word in the sentence e of language L1 and the word in the sentence f of language L2 in the multilingual corpus is calculated, and then the calculated average value is used as the combined translation probability between the word in the sentence e of language L1 and the word in the sentence f of language L2.

It should be understood although it is described above that the standard word alignment and the induced word alignment between language L1 and language L2 are combined by using the above formula (2), the method of the formula (2) is just an example, and the standard word alignment and the induced word alignment between language L1 and language L2 can be combined by using any method known by those skilled in the art.

Moreover, it should be understood although it is described above that the weighted average value is used as the combined translation probability between the word in the sentence e of language L1 and the word in the sentence f of language L2, any average value such as an arithmetic average value, a geometric average value, or a combination thereof between the standard word alignment and the induced word alignment can be used as the improved word alignment information 50 between language L1 and language L2.

Next, the method of the embodiment will be further described with an example.

For example, for the following three sentences:

フライト を 変更し たい のですが 。

I would like to change my flight

我 想 改一下 我的 航班 。

They can be aligned as:

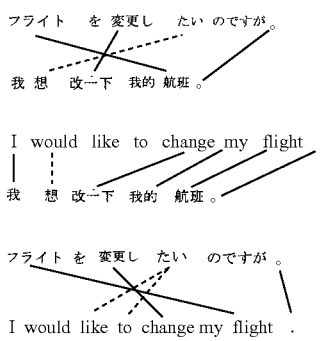

If Japanese is used as language L1, English is used as language L2, and Chinese is used as pivot language LS, the standard word alignment between Japanese and English is:

フライト を 変更し たい のですが 。
I would like to change my flight .

Alignment between Japanese and Chinese and alignment between English and Chinese are respectively:

フライト を 変更し たい のですが 。
我 想 改一下 我的 航班 。

I would like to change my flight .
我 想 改一下 我的 航班 。

The induced word alignment between Japanese and English induced by using Chinese is:

フライト を 変更し たい のですが 。
I would like to change my flight .

The improved word alignment obtained by combining the standard word alignment and the induced word alignment between Japanese and English is:

フライト を 変更し たい のですが 。
I would like to change my flight .

Therefore, the error alignment "たい"-"like to" between Japanese and English can be improved as "たい" "would like to" by using Chinese as a pivot language.

Also, alignment between Chinese and English can be improved by using Japanese as a pivot language, and alignment between Chinese and Japanese can be improved by using English as a pivot language.

Through using the method for improving word alignment quality in a multilingual corpus, word alignment quality between any two languages in the multilingual corpus can be improved by using the pivot languages, and whole word alignment quality and consistency of the multilingual corpus can be improved.

Further, if the multilingual corpus with improved word alignment quality and consistency of the embodiment of the present invention is used for machine translation, information retrieval and information extraction, the accuracy of machine translation, information retrieval and information extraction can be improved significantly.

Apparatus for Improving Word Alignment Quality in a Multilingual Corpus

Figure 2:
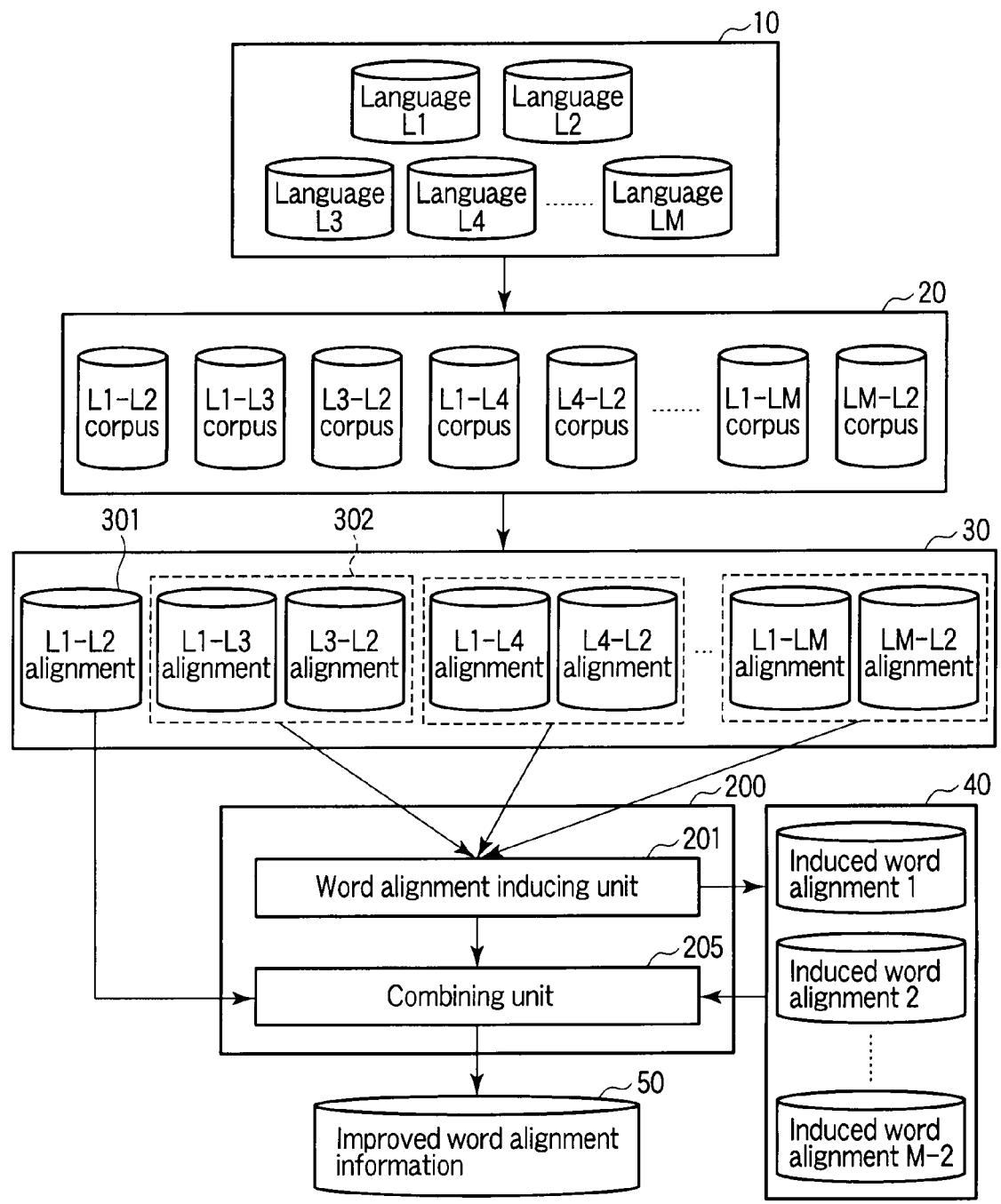
FIG. 2 is a block diagram showing an apparatus for improving word alignment quality in a multilingual corpus according to another embodiment of the present invention.

Under the same inventive conception, FIG. 2 is a block diagram showing an apparatus for improving word alignment quality in a multilingual corpus according to another embodiment of the present invention. Next, the present embodiment will be described in conjunction with FIG. 2. For those same parts as the above embodiments, the description of which will be appropriately omitted.

As shown in FIG. 2, the apparatus 200 for improving word alignment quality in a multilingual corpus of the embodiment comprises: a word alignment inducing unit 201 configured to induce word alignment between a first sentence of a first language and a second sentence of a second language by using word alignment information between the first sentence of the first language and a third sentence of a pivot language corresponding to the first sentence and the second sentence and word alignment information between the second sentence of the second language and the third sentence of the pivot language; and a combining unit 205 configured to combine the word alignment induced by the word alignment inducing unit 201 and the word alignment information between the first sentence of the first language and the second sentence of the second language in the multilingual corpus.

In the embodiment, the multilingual corpus is same with that described in the above embodiment described with reference to FIG. 1, the description of which will be omitted here for clarity.

Next, the elements of the apparatus 200 for improving word alignment quality in a multilingual corpus of the embodiment will be described.

As shown in FIG. 2, induced word alignment 40 between language L1 and language L2 is induced by the word alignment inducing unit 201 by using word alignment information between language L1 and a pivot language and word alignment information between language L2 and the pivot language.

Specifically, induced word alignment 1 between language L1 and language L2 is induced by the word alignment inducing unit 201 by using L1-L3 alignment between language L1 and language L3 and L3-L2 alignment between language L3 and language L2. Similarly, for other pivot language L4, . . . , LM, induced word alignment 2, . . . , induced word alignment M-2 are induced.

Next, the process for obtaining induced word alignment 40 will be described in detail by using any one pivot language LS of the pivot languages as an example.

It is assumed that in L1-LS alignment, a sentence e of language L1 and a sentence p of pivot language LS are aligned, and in LS-L2 alignment, a sentence f of language L2 and the sentence p of pivot language LS are aligned. Thus, a translation probability between a word in the sentence e of language L1 and a word in the sentence f of language L2 can be induced by the word alignment inducing unit 201 by using the formula (1) in the above embodiment described with reference to FIG. 1.

That is to say, the word alignment inducing unit 201 of the embodiment comprises: a calculating unit configured to calculate a product of translation probability $t_{L1-LS}(p_k|e_i)$ between the word $e_i$ in the sentence e of language L1 and the word $p_k$ in the sentence p of pivot language LS with translation probability $t_{LS-L2}(f_j|p_k)$ between the word $f_j$ in the sentence f of language L2 and the word $p_k$ in the sentence p of pivot language LS; and a summing unit configured to sum the products with respect to all words in the sentence p of pivot language LS, and use the summed result as the induced translation probability between the word in the sentence e of language L1 and the word in the sentence f of language L2.

In the above formula (1), translation probability $t_{L1-LS}(p_k|e_i)$ between the word $e_i$ in the sentence e of language L1 and the word $p_k$ in the sentence p of pivot language LS and translation probability $t_{LS-L2}(f_j|p_k)$ between the word $f_j$ in the sentence f of language L2 and the word $p_k$ in the sentence p of pivot language LS are obtained in the process for obtaining word alignment information 30 and saved in word alignment information 30. The present invention has no limitation on the method for obtaining translation probability $t_{L1-LS}(p_k|e_i)$ and translation probability $t_{LS-L2}(f_j|p_k)$, which can be obtained by using the statistical methods in the above reference 1 or any other methods known by those skilled in the art.

It should be understood although it is described above that the translation probability between the word in the sentence e of language L1 and the word in the sentence f of language L2 is induced by using the above formula (1), the method of the formula (1) is just an example, and the induced word alignment between language L1 and language L2 can be induced based on L1-LS alignment and LS-L2 alignment by using any method known by those skilled in the art.

In the embodiment, the standard word alignment between language L1 and language L2 in word alignment information 30 and induced word alignment 40 induced by the word alignment inducing unit 201 are combined by the combining unit 205 as improved word alignment information 50 between language L1 and language L2.

Specifically, for example, the standard word alignment between language L1 and language L2 and induced word alignment 40 induced by the word alignment inducing unit 201 can be combined by the combining unit 205 by using the formula (2) in the above embodiment described with reference to FIG. 1.

That is to say, the combining unit 205 of the embodiment comprises a calculating unit configured to calculate an average value between a translation probability between a word in the sentence e of language L1 and a word in the sentence f of language L2 in induced word alignment 40 and a translation probability between the word in the sentence e of language L1 and the word in the sentence f of language L2 in the multilingual corpus, and then use the calculated average value as the combined translation probability between the word in the sentence e of language L1 and the word in the sentence f of language L2.

It should be understood although it is described above that the standard word alignment and the induced word alignment between language L1 and language L2 are combined by the combining unit 205 by using the above formula (2), the method of the formula (2) is just an example, and the standard word alignment and the induced word alignment between language L1 and language L2 can be combined by using any method known by those skilled in the art.

Moreover, it should be understood although it is described above that the weighted average value is used as the combined translation probability between the word in the sentence e of language L1 and the word in the sentence f of language L2, any average value such as an arithmetic average value, a geometric average value, or a combination thereof between the standard word alignment and the induced word alignment can be used as the improved word alignment information 50 between language L1 and language L2.

Next, the apparatus 200 of the embodiment will be further described with an example.

For example, for the following three sentences:

フライト を 変更し たい のですが 。

I would like to change my flight

我 想 改一下 我的 航班 。

They can be aligned as:

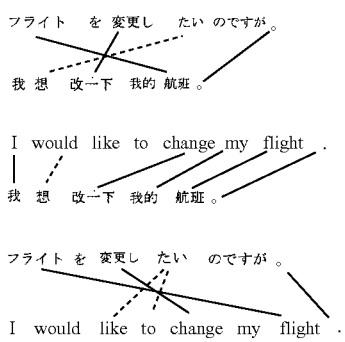

If Chinese is used as language L1, English is used as language L2, and Japanese is used as pivot language LS, the standard word alignment between Chinese and English is:

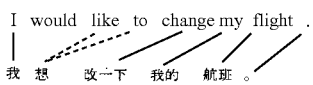

Alignment between Chinese and Japanese and alignment between English and Japanese are respectively:

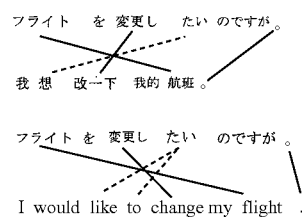

The induced word alignment between Chinese and English induced by the word alignment inducing unit 201 by using Japanese as the pivot language is:

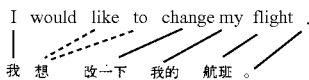

The improved word alignment obtained by combining the standard word alignment and the induced word alignment between Chinese and English by the combining unit is:

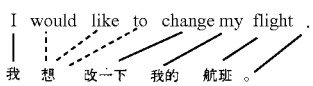

Therefore, the error alignment "想"-"would" between Chinese and English can be improved as "想"-"would like to" by using Japanese as the pivot language.

Also, alignment between Japanese and English can be improved by using Chinese as the pivot language, and alignment between Chinese and Japanese can be improved by using English as the pivot language.

Through using the apparatus 200 for improving word alignment quality in a multilingual corpus, word alignment quality between any two languages in the multilingual corpus can be improved by using the pivot languages, and whole word alignment quality and consistency of the multilingual corpus can be improved.

Further, if the multilingual corpus with improved word alignment quality and consistency of the embodiment of the present invention is used for machine translation, information retrieval and information extraction, the accuracy of machine translation, information retrieval and information extraction can be improved significantly.

Though a method and an apparatus for improving word alignment quality in a multilingual corpus have been described in details with some exemplary embodiments, these above embodiments are not exhaustive. Those skilled in the art can make various variations and modifications within the spirit and the scope of the present invention. Therefore, the present invention is not limited to these embodiments; rather, the scope of the present invention is only defined by the appended claims.

What is claimed is:

1. A method for improving word alignment quality in a multilingual corpus, the multilingual corpus including a plurality of corresponding sentence pairs between any two languages among a first language, a second language, and at least one other language, and word alignment information between each of said plurality of corresponding sentence pairs, the method comprising:

inducing word alignment between a first sentence of said first language and a second sentence of said second language by using said word alignment information between said first sentence of said first language and a third sentence of said at least one other language corresponding to said first sentence and said second sentence, and said word alignment information between said second sentence of said second language and said third sentence of said at least one other language; and combining said induced word alignment and said word alignment information between said first sentence of said first language and said second sentence of said second language in said multilingual corpus, wherein said inducing step includes calculating, by a computer, a product of (1) a translation probability between a word in said first sentence of said first language and a word in said third sentence of said at least one other language with (2) a translation probability between a word in said second sentence of said second language and said word in said third sentence of said at least one other language; and summing, by the computer, said product with respect to all words in said third sentence of said at least one other language to generate a sum, wherein the sum is used as an induced translation probability between said word in said first sentence of said first language and said word in said second sentence of said second language, and wherein said combining step includes
calculating an average value of (1) the induced translation probability between a word in said first sentence of said first language and a word in said second sentence of said second language, and (2) a translation probability between said word in said first sentence of said first language and said word in said second sentence of said second language in said multilingual corpus.

2. The method according to claim 1, wherein said average value comprises an arithmetic average value, a geometric average value, a weighted average value or a combination thereof.

3. The method according to claim 1, wherein said combining step comprises:
combining said induced word alignment and said word alignment information between said first sentence of said first language and said second sentence of said second language in said multilingual corpus by using the following formula:

$$t(f_j \mid e_i) = \sum_{q=0}^{M-2} \lambda_q \cdot t_q(f_j \mid e_i)$$

wherein e is said first sentence of said first language, f is said second sentence of said second language, $e_i$ is an $i^{th}$ word in said first sentence, $f_j$ is an $j^{th}$ word in said second sentence, $t(f_j|e_i)$ is the combined translation probability between said word $e_i$ in said first sentence of said first language and said word $f_j$ in said second sentence of said second language, $t_0(f_j|e_i)$ is a translation probability between said word $e_i$ in said first sentence of said first language and said word $f_j$ in said second sentence of said second language in said multilingual corpus, $t_q(f_j|e_i)$ is a translation probability, induced by using a $q^{th}$ language of said at least one other language, between said word $e_i$ in said first sentence of said first language and said word $f_j$ in said second sentence of said second language when M-2>q>0, M is the total number of said first language, said second language, and said at least one other language, and λq is a weight.

4. An apparatus for improving word alignment quality in a multilingual corpus, the multilingual corpus including a plurality of corresponding sentence pairs between any two languages among a first language, a second language, and at least one other language, and word alignment information between each of said plurality of corresponding sentence pairs, the apparatus comprising:
a memory storing the word alignment information;
a word alignment inducing unit configured to induce word alignment between a first sentence of said first language and a second sentence of said second language by using said word alignment information between said first sentence of said first language and a third sentence of said at least one other language corresponding to said first sentence and said second sentence, and said word alignment information between said second sentence of said second language and said third sentence of said at least one other language; and
a combining unit configured to combine said word alignment induced by said word alignment inducing unit and said word alignment information between said first sentence of said first language and said second sentence of said second language in said multilingual corpus,
wherein said word alignment inducing unit includes
a calculating unit configured to calculate a product of (1) a translation probability between a word in said first sentence of said first language and a word in said third sentence of said at least one other language with (2) a translation probability between a word in said second sentence of said second language and said word in said third sentence of said at least one other language; and
a summing unit configured to sum said product with respect to all words in said third sentence of said at least one other language to generate a sum, wherein the sum is used as an induced translation probability between said word in said first sentence of said first language and said word in said second sentence of said second language, and
wherein said combining unit includes
a calculating unit configured to calculate an average value of (1) the translation probability induced by said word alignment inducing unit between a word in said first sentence of said first language and a word in said second sentence of said second language, and (2) a translation probability between said word in said first sentence of said first language and said word in said second sentence of said second language in said multilingual corpus.

5. The apparatus according to claim 4, wherein said average value comprises an arithmetic average value, a geometric average value, a weighted average value or a combination thereof.

6. The apparatus according to claim 4, wherein said combining unit is configured to combine said word alignment induced by said word alignment inducing unit and said word alignment information between said first sentence of said first language and said second sentence of said second language in said multilingual corpus by using the following formula:

$$t(f_j \mid e_i) = \sum_{q=0}^{M-2} \lambda_q \cdot t_q(f_j \mid e_i)$$

wherein e is said first sentence of said first language, f is said second sentence of said second language, $e_i$ is an $i^{th}$ word in said first sentence, $f_j$ is an $j^{th}$ word in said second sentence, $t(f_j|e_i)$ is the combined translation probability between said word $e_i$ in said first sentence of said first language and said word $f_j$ in said second sentence of said second language, $t_0(f_j|e_i)$ is a translation probability between said word $e_i$ in said first sentence of said first language and said word $f_j$ in said second sentence of said second language in said multilingual corpus, $t_q(f_j|e_i)$ is a translation probability, induced by using a $q^{th}$ language of said at least one other language, between said word $e_i$ in said first sentence of said first language and said word $f_j$ in said second sentence of said second language when M-2>q>0, M is the total number of said first language, said second language, and said at least one other language, and λq is a weight.

* * * * *